3,094,937
HYDRAULIC DEVICE
Kyle E. McAfee, Jr., Kalamazoo, Mich., assignor to The New York Air Brake Company, a corporation of New Jersey
Filed Nov. 20, 1961, Ser. No. 153,453
3 Claims. (Cl. 103—42)

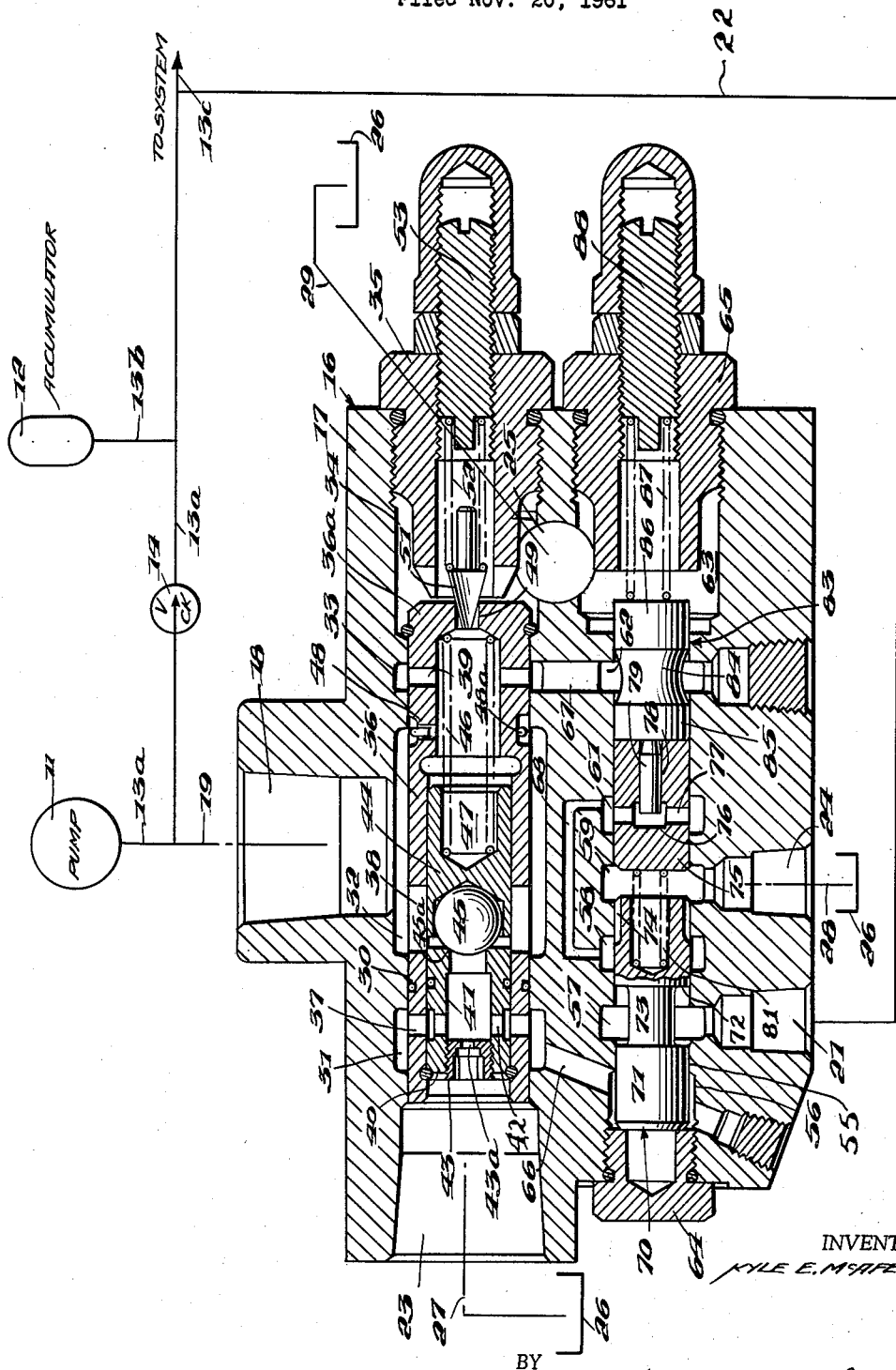

This invention relates to systems for delivering hydraulic fluid under pressure to closed center directional control valves, and more particularly to those systems that employ a continuously-running fixed displacement pump, an accumulator and an unloading valve.

The object of this invention is to provide an unloading device for these fluid supply systems that utilizes a conventional pilot-operated relief valve.

As is known in the art, the conventional pilot-operated relief valve includes a main relief valve, means responsive to the pressure upstream of the main relief valve for shifting it in the opening direction, a piloted motor in restricted communication with a point upstream of the main valve and urging it in the closing direction, and a pilot relief valve located in a vent passage leading from the piloted motor. Normally these pilot-operated relief vavles are used as pressure limiting devices, i.e., they impose a high back pressure on the pump. However, they can be converted to low pressure relief or unloading devices by venting the piloted motor through a relatively unrestricted flow path. Such a vent path, in effect, eliminates the pilot relief valve from the circuit.

The present invention combines a conventional high pressure pilot-operated relief valve with a piloted motor vent passage that is opened and closed by a motor operated shuttle valve. Normally the shuttle valve is closed. The invention also provides a selecting device that is under the control of the main relief valve and which is effective when that valve is open to transmit accumulator pressure to the motor operator associated with the shuttle valve, and when the main relief valve is closed, to vent the motor operator. In the preferred embodiment, the selector responds directly to the flow rate in the unloading passage since the presence or absence of a flow through this path is indicative of the position of the main relief valve. When the accumulator being supplied by the pump is fully charged, the pilot relief valve opens to vent the piloted motor and cause opening movement of the main relief valve. This latter movement creates a flow through the unloading passage to sump thereby causing the selector to transmit accumulator pressure to the motor operator of the shuttle valve. The shuttle valve is then opened to bypass the pilot relief valve with the result that the pilot relief valve closes and is effectively removed from the circuit and the main relief valve is converted to a low pressure unloading valve. The main relief valve now opens further and allows flow to sump at minimum back pressure. When the accumulator pressure drops to a given minimum value, the motor operator closes the shuttle valve and thus interrupts the venting of the piloted motor. This action closes the main relief valve, reloads the pump, and restores the high pressure relief function of the pilot-operated relief valve.

The preferred embodiment of the invention will be described in detail with reference to the accompanying drawing whose single figure illustrates a typical hydraulic system incorporating the invention.

As shown in the drawing, the hydraulic system includes a fixed displacement pump 11 that is connected with a closed center directional control valve (not shown) via conduits 13a and 13c, an accumulator 12 that is connected with conduit 13a through conduit 13b, and a check valve 14 that is located in conduit 13a between pump 11 and the intersection of conduit 13b. An unloading valve 16 is connected with the system at points upstream and downstream of check valve 14 by conduits 19 and 22, respectively, and serves to unload pump 11 to sump 26 when the accumulator 12 is charged and to close the unloading path when accumulator pressure drops below a given minimum value.

The unloading valve 16 includes a housing 17 containing an inlet port 18 connected with conduit 19, a pilot port 21 connected with conduit 22, and three exhaust ports 23, 24, and 25 connected with sump 26 via conduits 27, 28, and 29, respectively. Extending through housing 17 in alignment with exhaust port 23 is a bore 30 whose right end is closed by plug 35 and which contains the pilot-operated relief valve. This valve comprises a sleeve 36 that is fixed in the bore 30 by a snap ring and contains three longitudinally spaced sets of radial passages 37, 38, and 39 that register with the annular chambers 31, 32, and 33, respectively, that intersect the bore. Reciprocable in sleeve 36 is a valve plunger 44 into the left end of which is pressed the ball head 45 of the main relief valve. Ball 45 is arranged to engage the annular valve seat 45a surrounding the axial bore 41 formed in the seat insert 40. The plunger 44 is biased toward the seat 45a by a light coil compression spring 46 and by the pressure force developed by a piloted piston motor that consists of the working chamber 47 and the right end of plunger 44. The working chamber 47 is connected with the inlet port 18 by a radial passage 48 formed in sleeve 36 and the annular chamber 32; the passage 48 being restricted by the inturned end of a wire 48a that partially encircles sleeve 36. The movable head 45 of the main relief valve is shifted to the right away from its seat by the fluid pressure transmitted to the space between the left end of plunger 44 and the right end of seat insert 40 by the radial passages 38. The working chamber 47 of the piloted motor is provided with a vent path that comprises the axial passage 49 formed in sleeve 36, the annular chamber 34, and the exhaust port 25, and the pilot relief valve 51 normally closes this path. Valve 51 is biased closed by a spring 52 that is seated on the adjustable seat 53. As will appear below, the cracking pressure of pilot relief valve 51 determines the maximum pressure to be established in accumulator 12, and consequently the pressure at which the unloading device 16 will commence to unload pump 11.

The housing 17 also contains a second through bore 55 whose opposite ends are closed by plugs 64 and 65 and which contains the shuttle valve and selector mentioned above. The shuttle valve includes an annular chamber 62, that is in continuous communication with the annular chamber 33 associated with bore 30 through passage 67, and a reciprocable plunger 83 formed with a groove 84 that defines two lands 85 and 86. A coil compression spring 87 biases the plunger 83 to the illustrated closed position in which lands 85 and 86 isolate annular chamber 62 and thus prevent flow from working chamber 47 of the piloted motor through passage 67. The plunger 83 is shifted to the right to the open position in which groove 84 spans annular chambers 62 and 63, and thus opens a vent path from working chamber 47 to exhaust port 25, by a piston motor operator contained in a plug 75 that is pressed into bore 55. This motor comprises a working chamber 76 and piston pin 79 that reciprocates in the axial bore 78 formed in plug 75. The bias exerted by spring 87 can be varied by advancing and retracting the adjustable seat 88 and, as will be evident from the description of operation, the load in this spring determines the minimum accumulator pressure (i.e., the pressure at which loading of pump 11 commences).

The selector comprises a reciprocable plunger 70 that is located in the left end of bore 55 and controls communication between annular chamber 58, which is in continuous communication with working chamber 76 through passage 68, annular chamber 61 and radial passages 77, and the annular chambers 57 and 59 that are connected respectively with the sump 26 and the accumulator. Plunger 70 is formed with a groove 73 that defines two lands 71 and 72 and is provided with a plurality of circumferentially spaced longitudinal slots 74. The plunger 70 is biased to the illustrated position in which it contacts plug 64 by a light coil compression spring 81 and in this position land 72 interrupts communication between annular chambers 57 and 58 and slots 74 interconnect annular chambers 58 and 59. Movement of the plunger 70 in the opposite direction to a position in which groove 73 interconnects chambers 57 and 58 and land 72 interrupts the previous connection between annular chambers 58 and 59 is effected by the pressure in annular chamber 56 which acts on the left end of the plunger. Since this chamber is in continuous communication with bore 41, which forms part of the unloading path, downstream of main relief valve 45 through passage 66, annular chamber 31 and radial passages 37 and 42, it will be pressurized whenever the main relief valve is open and vented whenever that valve is closed. It will be evident that the actuating pressure for selector valve 70 is the back pressure developed by the fluid flowing to sump 26 along the unloading path. In some cases, the flow resistance inherently afforded by conduit 27 is high enough to guarantee the existence of a back pressure sufficient to shift plunger 70. However, in order to prevent malfunction in those cases in which it is not, the preferred embodiment employs an auxiliary restriction in the form of an orifice 43a contained in a plug 43 threaded into the seat insert 40.

*Operation*

When the pump 11 is running and the pressure in accumulator 12 is below the desired minimum, the parts of the unloading valve 16 assume their illustrated positions and all of the fluid discharged by pump 11 is delivered to the accumulator 12. The discharge pressure of the pump 11 is transmitted to the left end of unloading plunger 44 via conduit 19, inlet port 18, annular chamber 32 and radial passages 38, and to working chamber 47 through annular chamber 32 and restricted radial passage 48. Since the sum of the forces devleoped by the piloted motor and the spring 46 exceeds the fluid pressure force developed on the left end of plunger 44, the unloading valve head 45 is maintained on its seat.

When accumulator 12 becomes fully charged (as determined by the setting of pilot relief valve 51), the pressure in working chamber 47 overcomes the closing bias on pilot relief valve 51 exerted by spring 52 and this valve opens. Fluid is then permitted to flow to sump 26 along a path including radial passage 48, chamber 47, passage 49, annular chamber 34, exhaust port 25 and conduit 29. Because of the fact that passage 48 is restricted, this flow of fluid creates a differential between the pressures acting on the opposite ends of unloading plunger 44. As a result, a net pressure force is developed on plunger 44 that shifts it to the right against the bias of spring 46 thereby opening the main relief valve. The fluid discharged by pump 11 may now flow to sump 26 along a second path that includes annular chamber 32, radial passages 38, bore 41, orifice 43a, exhaust port 23 and conduit 27. Although this second path is in reality the unloading path, the pump 11 is not unloaded at this stage of the operation because a high back pressure is required in order to maintain the relief valve 51 open.

The fluid flowing to sump 26 through orifice 43a creates a back pressure in bore 41 that is transmitted to annular chamber 56 through radial passages 42, annular chamber 31 and passage 66. The pressure in chamber 56 acts on the left end of the valve plunger 70 and shifts the plunger to the right thereby causing plunger groove 73 to interconnect annular chambers 57 and 58. Fluid under accumulator pressure may now flow to working chamber 76 in plug 75 via conduit 22, pilot port 21, annular chamber 57, plunger groove 73, annular chamber 58, passage 68, annular chamber 61 and radial passages 77, where it acts upon piston pin 79 and causes it to shift shuttle valve 83 to the right. This movement of the shuttle valve opens communication between annular chambers 62 and 63 through plunger groove 84 and establishes a second flow path from working chamber 47 to sump 26 that includes radial passages 39, annular chamber 33, passage 67, annular chamber 62, plunger groove 84, annular chamber 63, exhaust port 25 and conduit 29. Since this second path bypasses the first one that includes pilot relief valve 51 and allows substantially unrestricted flow from working chamber 47 to sump 26, the pressure in that chamber decreases suddenly and relief valve 51 closes. The main relief plunger 44 now moves further to the right and permits flow through the unloading path at minimum back pressure. As a result, pump 11 is unloaded.

The pump 11 continues to operate in an unloaded condition until the demand imposed on the accumulator 12 by the system reduces its pressure below a given minimum value. When this value is reached, the pressure force developed on, the piston pin 79 by the pressure in chamber 76 (which, it will be recalled, is accumulator pressure) is no longer able to hold shuttle valve 83 in its actuated position and spring 87 returns this valve to its illustrated position. This movement of shuttle valve 83 closes the exhaust path leading from spring chamber 47 to sump 26 with the result that the pressure in chamber 47 rises rapidly. As the pressures acting on opposite ends of unloading plunger 44 approach equality, spring 46 shifts plunger 44 to the left thereby closing the unloading path. Now all of the fluid discharged by pump 11 is again delivered to the accumulator 12. Since flow through the unloading path has ceased, the back pressure in annular chamber 56 is dissipated through passage 66, annular chamber 31, radial passages 37 and 42, orifice 43a, exhaust port 23 and conduit 27. Spring 81 is now permitted to return valve plunger 70 to the illustrated position wherein land 72 interrupts communication between annular chambers 57 and 58 and slots 74 interconnect annular chambers 58 and 59. Thus working chamber 76 is again vented.

It should be observed that the pressures at which unloading and loading commence are determined by the springs 52 and 87, respectively. Any desired differential between these pressure values can be obtained by simply adjusting the threaded seats 53 and 88.

As stated previously, the drawing and description relate only to a preferred embodiment of the invention. Since many changes can be made in the structure of this embodiment without departing from the inventive concept, the following claims should provide the sole measure of the scope of the invention.

What I claim is:

1. A system for delivering fluid under pressure comprising:
 a. a pump;
 b. a sump;
 c. a supply conduit connected with the pump and containing a check valve;
 d. an accumulator connected with the supply conduit downstream of the check valve;
 e. an unloading conduit connecting the pump with the sump;
 f. an unloading valve controlling flow through the unloading conduit and shiftable between conduit-opening and conduit-closing positions;
 g. first means responsive to the pressure in the unloading conduit upstream of the unloading valve for shifting the unloading valve toward its conduit-opening position;
 h. a pressure responsive piloted motor for shifting the unloading valve toward its conduit-closing position;
i. a restricted passage connecting the piloted motor with the unloading conduit upstream of the unloading valve;
j. a pair of exhaust passages connecting the piloted motor with the sump;
k. a relief valve located in one of the exhaust passages;
l. a shuttle valve shiftable between passage-opening and passage-closing positions for controlling flow through the other of the exhaust passages;
m. pressure responsive motor means connected with the shuttle valve and effective when pressurized a certain amount to shift the valve to its passage-opening position and when pressurized a lesser amount to shift that valve to its passage-closing position; and
n. selecting means rendered effective when the unloading valve is open and closed for connecting the motor means with the accumulator and the sump, respectively.

2. The system defined in claim 1 in which the selecting means comprises
a. a selector valve connected with the accumulator, the sump and the motor means and shiftable between a first position in which it connects the motor means with the sump and a second position in which it connects the motor means with the accumulator;
b. means biasing the selector valve toward its first position; and
c. actuating means responsive to the rate of flow through the unloading conduit for shifting the selector valve to its second position when fluid is flowing through the unloading conduit.

3. The system defined in claim 2 in which the pressure responsive motor means comprises
a. spring means biasing the shuttle valve toward its passage-closing position; and
b. a fluid pressure piston motor for moving the shuttle valve in the opposite direction.

No references cited.